INVENTOR
MARCEL DERAMOND
BY Young & Thompson
ATTYS.

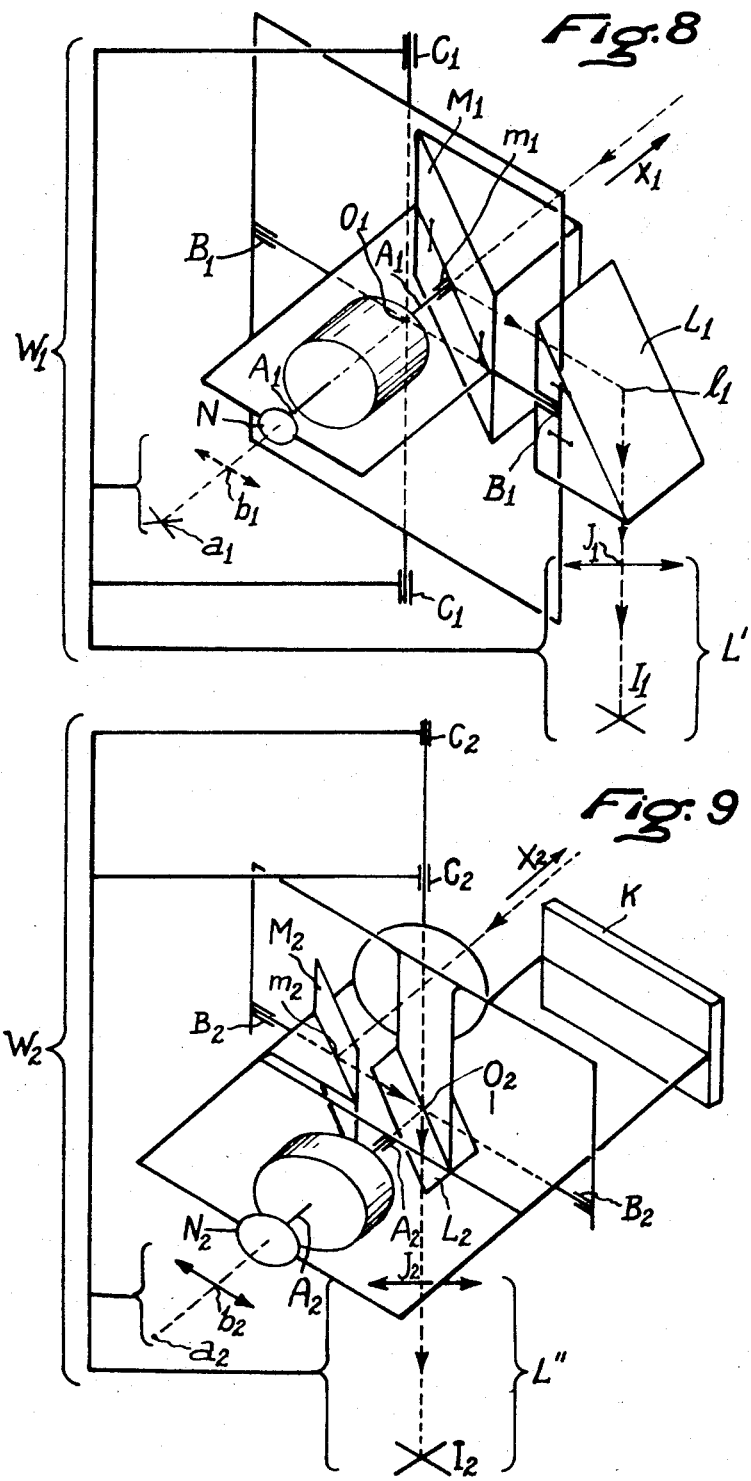

United States Patent Office 3,556,632
Patented Jan. 19, 1971

3,556,632
STABILIZED DIRECTION SIGHTING DEVICE
Marcel Déramond, 12 Rue Barrault,
Paris 13e, France
Continuation of application Ser. No. 540,966, Apr. 7,
1966. This application Jan. 15, 1969, Ser. No. 793,239
Claims priority, application France, Apr. 8, 1965,
12,389
Int. Cl. G02b 23/00
U.S. Cl. 350—16                                3 Claims

ABSTRACT OF THE DISCLOSURE

A sighting device for maintaining the image of a point at infinity in a fixed position on the reticle of a telescope despite movements of a vehicle on which the sighting device is mounted. It comprises a gyroscope the axis of whose rotor remains directed toward the point at infinity, an inner frame which is mounted for vertical swinging movement about a horizontal axis that passes through the axis of rotation of the rotor and which carries the rotor, an outer frame which carries the inner frame and which is mounted for rotation about a vertical axis that passes through the axis of rotation of the rotor and the horizontal rotative axis of the inner frame. At least one reflective surface is connected to at least one of the frames of the gyroscope in such a way that the reflective surface sends light from said point to the objective of the telescope in which the reticle is fixed, along a line parallel to said vertical axis.

This is a continuation of application 540,966 filed Apr. 7, 1966.

The present invention relates to visible light or infrared optical sighting devices by which it is possible to stabilize the sighting line on an object.

The main aims of the invention are to overcome the damaging effects on observation of the vibrations of the vehicle carrying the sighting device, and also movements of the said sighting device resulting from the displacement of the said vehicle.

According to the invention, the optical sighting device produces a stable image of an object despite movements of the device. It is constituted by a sighting device or a lunette, a gyroscope comprising a rotor mounted in a Cardan with means for adjustably mounting the latter on the vehicle, means to direct the axis of the rotor of the gyroscope toward the object to be observed, the sighting device being so arranged that the optical axis of its objective will be parallel to the axis of rotation of the external frame of the Cardan.

The sighting device described above is characterized by the combination (1) of a mirror rigidly connected to the inner frame of the gyroscope and disposed to reflect parallel rays which are in the direction of the axis of rotation of one of the frames; and (2) of an optical device which returns to the objective lens, in a direction fixed with respect to the objective, the rays emanating from a given fixed point and reflected by the said mirror, despite movements of the vehicle.

Generally speaking, there are two principal embodiments of the invention, as follows:

(I) In the first, the direction referred to in (1) above is that of the axis of rotation of the external frame and the optical means referred to in (2) above is an anomorphic element in front of the mirror whose enlargement is 2/1 in the optical plane passing through the axis of rotation of the outer frame and 1/1 in the optical plane perpendicular to the first plane and passing through the axis of rotation of the internal frame.

(II) The direction referred to in (1) is that of the rotation of the internal frame, and the optical means referred to in (2) is a mirror rigidly connected to the external frame.

FIGS. 4, 5, 6 and 7 give examples of anamorphic afocal optical systems for the first embodiment.

FIGS. 8 to 11 are perspective views of a further embodiment of the invention.

As a general observation it will be seen that the accompanying drawings are intended to represent balanced gyroscope rotors. For instance, FIGS. 1 and 9 show a counterweight K adapted for this balancing, and which will be referred to in due course.

In devices of this general type, it is known to provide a gyroscopic rotor whose bearings are carried by the inner frame of a Cardan suspension or gimbal ring which in turn is pivoted on an outer frame or gimbal ring, the outer frame in turn being pivotally mounted on the carrier vehicle. The axis of the rotor and the axis of the two frames intersect each other at right angles. The rotor contains a sighting device in the form of an ordinary sighting telescope whose sighting line lies on the axis of the rotor; and when the rotor is spinning, its axis, and hence the sighting line of the telescope, remain fixed on a remote point. The gyroscope can carry a mirror that rotates in the outer gimbal ring about an axis parallel to the axis of rotation of the inner gimbal ring. A portion of an optical axis of the telescope can thus be maintained parallel to or coincident with the axis about which the outer gimbal ring rotates on the vehicle. By suitably connecting the mirror, the mirror can be caused to shift constantly to maintain the desired relationship between the axes of rotation and the various portions of the optical axis. However, this constant shifting of the mirror is inconvenient because the inertia of the mirror militates against the most desirable operation of the device.

With a sighting device of the present invention it is possible specifically to obtain the advantage of avoiding the inconvenience caused by the inertia of the mirror. The said mirror, still connected to a gyroscope, is included in an optical system, in an arrangement such that the stabilization of the sighting line is obtained when the mirror is restricted to the same movements as those of the gimbal ring carrying the rotor. In this case its inertia is no longer harmful.

Figure 1:
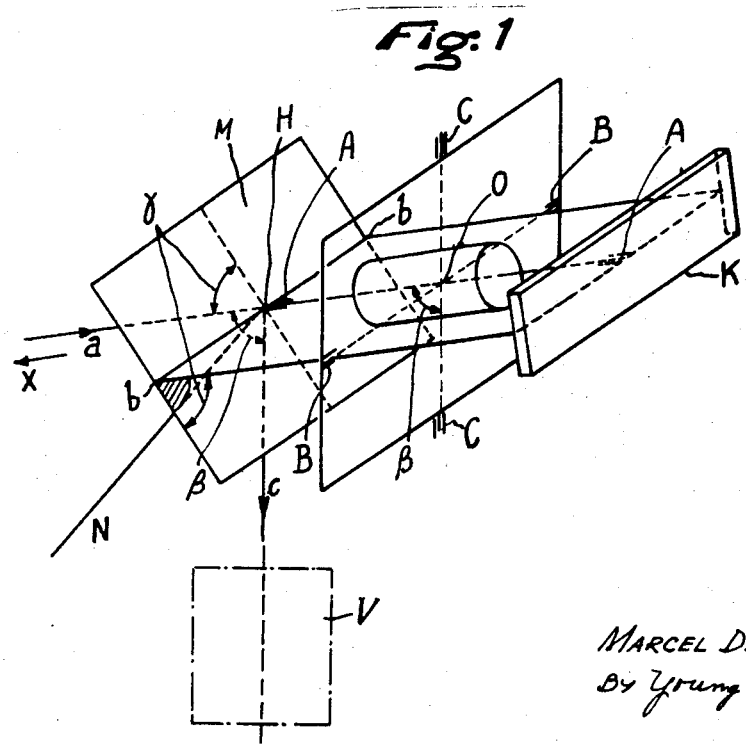
FIGS. 1 and 2 are perspective views of the third and second embodiments of the invention.
Figure 2:
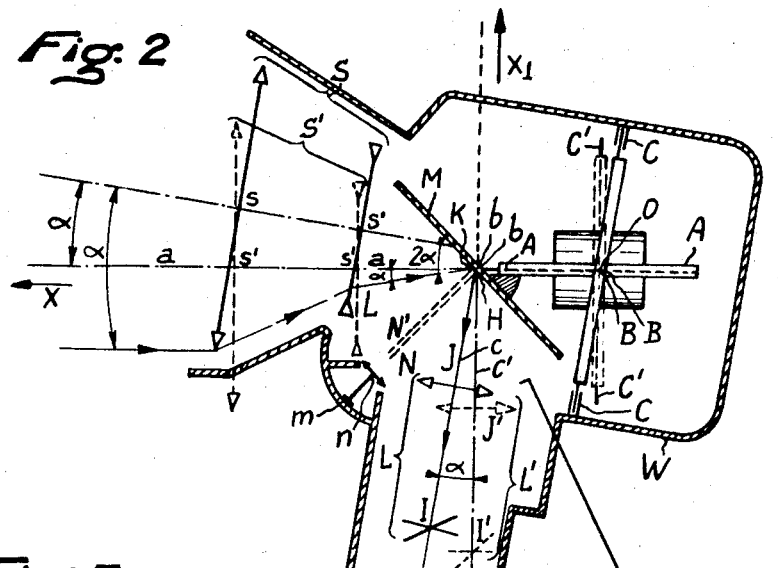

FIGS. 1 and 2 show the said sighting device.

Here again, the stabilization is obtained by means of a free gyroscope with two degrees of freedom (FIG. 1). It is equipped with a rotor having an axis AA carried by an inner frame or gimbal ring that can rotate about an axis BB, perpendicular to the axis AA; the said axis BB is itself carried by an outer frame or gimbal ring that in turn can rotate about the axis CC of the gyroscope, perpendicular to the axis BB; the bearings establishing the said axis CC are integral with the body W of the sighting device V. The axes AA, BB, CC, intersect each other at a point O that is the Cardan centre of the gyroscope. If the axis CC that passes through the body W of the sighting device V is caused to rotate about the point O in all ways possible, the axis AA of the centrifuge always remains fixed in space: It is supposed here again that the axis AA of the rotor passes through the point sighted at infinity X.

In the present invention, the optical system that is adapted to use the rigid fixation of the axis AA for the stabilization of the sighting line when the axis CC is mobile about O, is in the first place described (FIG. 1) in the initial position in order to simplify the explanation:

A mirror M, is connected to the inner Cardan frame of the gyroscope, fixed rigidly on the latter. This mirror receives light rays emanating from point X and directs them into a lunette or sighting device V schematically shown in FIG. 1. The mirror M contains the segment $bb$ of the inner Cardan, parallel to the axis BB about which the said Cardan rotates. Finally the mirror M, by reason of its construction, forms a constant angle $\gamma$ with the axis AA, the value of which is defined by means of the particular value $\beta$ of the variable angle (OA, OC) for the initial position:

$$\gamma = 90° - \frac{\beta}{2}$$

H designates the centre of $bb$ (it is supposed that H is located in the plane AOC); HN is the normal of the mirror at H; H$a$ and H$c$ are the parallels drawn by H to AA and to CC. It is established that:

$$(Ha, Hc) = \beta$$

and that the normal HN at the mirror is the bisector of the angle (H$a$, H$c$). The value $\beta = 90°$ is frequently the most interesting, from which it follows that $\gamma = 45°$, but it is not always necessary to take these values.

A variant form is shown in FIG. 2.

The optical system integral with the body W of the sighting device V, to which the external axis CC of the gyroscope is already fixed, comprises (FIG. 2):

In front of the mirror M, an anamorphic afocal system S:

At the rear of the mirror M, the objective L of the sighting device V, behind which the object line of sight IJ is defined by the crossing of the reticle I.

The plane of FIG. 2 is the plane AOC in the initial position.

The anamorphic afocal system S, which in the first hypothesis is supposed to be a Galileic arrangement with cylindrical lenses, has two planes of symmetry; the first perpendicular to the generatrixes of the cylindrical lenses, the second parallel to its generatrixes and perpendicular to the first plane of symmetry. That is to say that the cross section of the system S in the plane of FIG. 2 is similar to that of a Galileic sighting device with a convergent objective and a divergent eyepiece, but the lens used is cylindrical. In the initial position, the first plane of symmetry is coincident with the plane AOC or the plane $a$H$c$; the second plane of symmetry is coincident with the plane $c$H$v$. For an object in the plane $a$H$e$, the magnification is 2; for an object in the plane $a$H$b$, the magnification is 1. The straight line $ss$ is the intersection of the two planes of symmetry of the anamorphic system S. In the initial position it is coincident with H$a$ and with AA. This initial position is shown in part on FIG. 2 by broken lines whose corresponding reference numerals are designated with a prime. The sighted point X at infinity in the direction fixed AA in the initial position, has as its image through the optical system formed of S' and M' $a$ point at infinity $X_1$, located on the straight line $H_c'$ parallel to the external axis CC' of the gyroscope.

The body W of the sighting device V, is arranged beyond the mirror M; its optical axis IJ, defined by the crossing I of the lines of the reticle and the optical centre J of the objective, is coincident in the initial position I'J' with the straight line $H_c'$. Accordingly, in the initial position, the image of the point X sighted at infinity through the system formed of the anamorphic afocal S', of the mirror M, and of the objective L' of the sighting device is at the crossing I' of the wires of the reticle. IJ (in its initial location I'J') will be designated as: image sighting line of the device; and the image of this line, obtained by return of the light, through the optical system formed of the mirror M and of the anamorphic afocal, will be called: object sighting line. In the initial position the sighting line "object" is X'H, coincident with the axis AA of the rotor of the gyroscope, which is then to some extent the initial sighting line—"object."

If now (FIG. 2) the body W of the sighting device V is rotated from the initial position in any way about O, to place it in a position shown in full line, all the elements defined above occupy in general positions that are different from the initial positions; while the initial positions are indicated by primed characters, the new positions are not, for example S' becomes S; L' becomes L; B' becomes B; and C' becomes C; and so on, only the sighted point X, the axis AA which passes through the point X and the point O will always keep their initial positions, at least provided one does not cause the precession of the gyroscope.

Any rotation (that is to say about an axis that can be different from AA, BB or CC) making it possible to pass from the initial position of the body of the sighting device to the position W, can be split up into three successive elementary rotations: about the said axes A—A, B—B and C—C, without changing the image sighting line IJ which is directed toward a given distant point. Thus the rotation about the axis A—A merely inclines the image about the sighted point. The rotation about the axis C—C has no effect, because with respect to the generatrices of the anamorphic lenses, these may be considered to be the same as a plate with parallel faces. Finally, rotation about the axis B—B, by virtue of anamorphic enlargement of 2 to 1, creates a double along the line of sight by displacement which however is compensated by the fact that simultaneously the mirror M displaces the luminous rays equally as a double in the opposite direction.

It can definitively be stated that after the third period i.e. after any kind of rotation, the sighting line—"image" I'J' continues to supply, following the inverse path of the light, after reflexion from the mirror connected to the gyroscope and after passage through the anamorphic afocal system, an object sighting line parallel to the initial sighting line AA. The image of the point sighted at infinity X is still at the crosslines, of the reticle. The sighting line is well stabilized.

It can be shown that the two following conditions, realized for the said sighting device of type 1, are the conditions necessary for obtaining a strictly stabilized sighting line: the axis CC of the gyroscope should be parallel to the image sighting line, defined as the straight line joining the optical centre J of the objective and the crossing I of the lines of the reticle; the object sighting line defined, by reversing the direction of the light, as coupled with the image sighting line through the optical system formed of the mirror M connected to the gyroscope and of the anamorphic afocal system S, should be parallel to the axis AA of the centrifuge.

Furthermore it is possible to obtain a strictly stabilized sighting line by fulfilling the above conditions only approximately, with the desired object of obtaining an image that is not subjected to vibrations, this being done in the following way:

Instead of materialising the sighting line through the optical axis of sighting device arranged behind the mirror connected to the gyroscope, it is materialised through the optical axis of a known auxiliary collimator (not shown), connected rigidly to the inner gimbal ring of the gyroscope. This collimator is comprised in its simplest form by a reticle cross hair disposed at the object focal plane of a convergent lens. The image of the cross hair in the collimator is seen at infinity permanently in the sighting device, taking care to observe the two conditions given below:

The sighting line projected in the sighting device should be strictly parallel to the axis of the rotor of the gyroscope;

The sighting line should be projected in front of all the optical elements of the sighting device.

The sighting line materialised in this way is the object sighting line.

For the sighting device V of type 1 shown in the FIGS. 1 and 2, it has been established above that there is invariability of the sighting line on a point fixed in infinity X when one subjected the body of the sighting device to any rotations whatsoever about a point such as O for example, and when there was no precession of the gyroscope. It will now be studied how (FIG. 3) to pass from the sighting line on a fixed point at infinity X to the sighting line on another fixed point at infinity $X_1$ angularly adjacent to X, supposing this time the body W of the sighting device V is stationary.

Thus it suffices to direct the axis AA of the rotor of the gyroscope towards the new image point to be viewed by precession of the gyroscope by motor means applying a couple thereto (not shown). As is known, the application of a couple to the rotative axis BB will result in displacement of the gyroscope about the axis CC. Likewise, the application of a couple to the rotative axis CC produces a displacement of the gyroscope about the axis BB. Removal of the couple leaves the gyroscope fixed in its adjusted position.

Accordingly, one has a sighting device not only capable of damping the vibrations to improve the image and the rotary movements of the device but also making it possible to pilot the sighting line (materialised through a reticle and fixed so as to be parallel to the axis of the rotor) by causing the precession of gyroscope by means of motor couplings. As the mirror is restricted to the same movements as those of the frame or ring carrying the rotor, the inertia of the mirror is no inconvenience to the stabilization for high frequency vibrations transmitted to the body of the sighting device.

Figure 3:
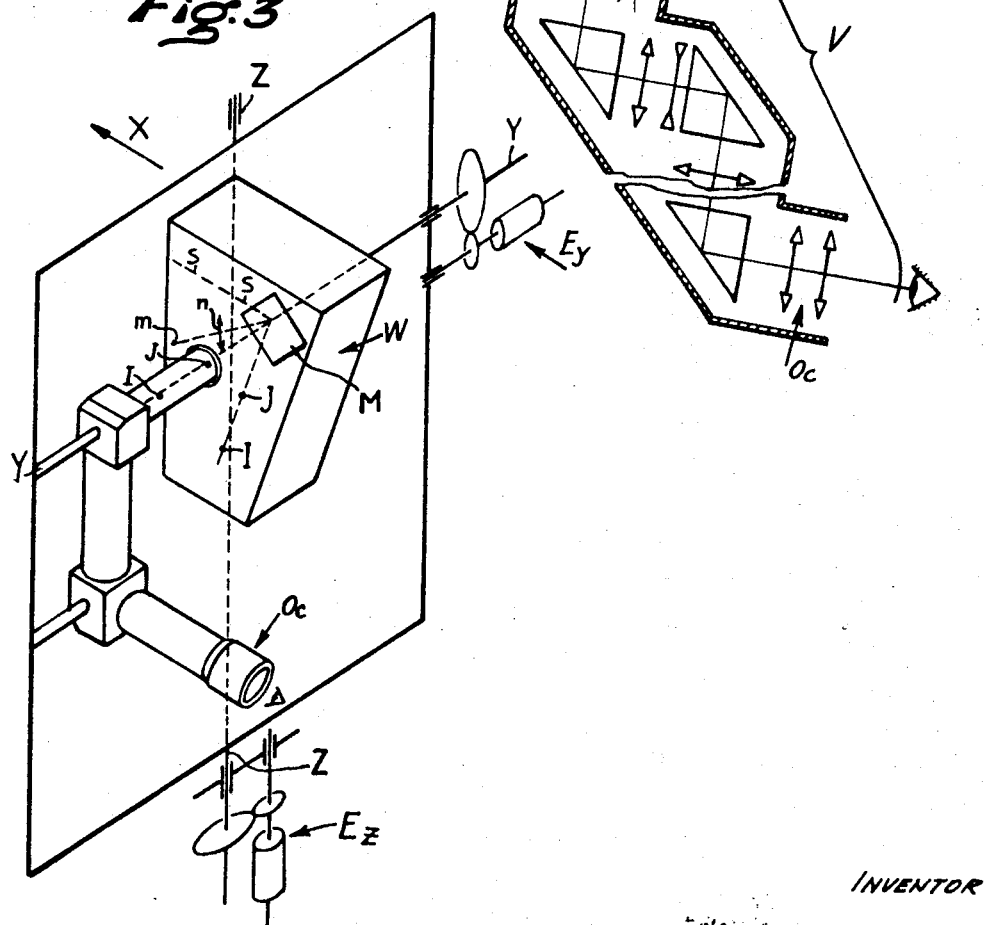
FIG. 3 is a variation of FIGS. 1 and 2.

There is nevertheless still a disadvantage in the sighting devices of type 1: in actual fact, when the unit connected to the gyroscope is displaced by too great an angle in relation to the body of the sighting device, there can be field stops or pupil stops i.e. an insufficiency of the optical qualities of the anamorphic afocal system when it is caused to work with rays that are inclined at too great an angle on the axis $ss$. Furthermore, in order to overcome such inconveniences, it is advisable (FIG. 2) to control the body W of the sighting device V by the displacements of the mirror M, in such a way as to constantly recover the relative initial arrangement of the parts of the sighting device, by rotation of the body W of the sighting device about two Cardan axes generally rectangular to but not necessarily coincident with or parallel to the axes BB and CC of the gyroscope. A method of ensuring this control is as follows: the direction of the plane of the mirror M is fixed in the initial position, by regulating the optical axis ($mn$) of an auto-collimator system $m$; that cross hairs of the reticle disposed in the object focal plane of the convergent lens $n$ that is integral with the body W of the sighting device, the axes of the auto-collimator being perpendicular to the mirror. The detection of the rotations of W in relation to the mirror M is then obtained at the focus point of the objective lens of the auto-collimator system. A known servo mechanism ensures the cancelling out of dispersions by rotation of the body W of the sighting device V about these two Cardan axes. For this purpose, the servo mechanism disclosed in U.S. Pat. 3,326,619 may be used. FIG. 3 shows a possible arrangement of the axes of rotation of the drive mechanisms $E_y$ and $E_z$. The two axes are ZZ (vertical) and YY (horizontal). A diagrammatic representation is given of the main axes of the sighting device (IJ, $ss$), the mirror M and the optical axis $mn$ of the auto-collimator system and the sighted point X. In this arrangement the eyepiece fixed on site can be obviously maintained by means of the stabilization of the relative position of the image line of sight and the body W. By known reflection of the light rays by mirrors (not shown) it is possible to orient the objective $O_c$ in the position indicated in FIG. 3.

It should be noted that the controlling of the body of the sighting device V by the mirror M is done with the sole aim of approximately re-centering the optical systems and accordingly need not be very accurate: a precision of the order of 1° is for instance adequate. Furthermore it is not necessary for this "following" of the mirror M by the body W of the sighting device V, which plays the part of a "ghost" following along behind, to take place with a perfectly regular movement, as the vibrations or irregularities in the rotations of W then do not play a role in the focusing.

If the necessity for the mirror M to be followed by the body W of the sighting device V somewhat complicates the sighting system of the sighting devices of type 1, it should nevertheless be stated that each time it is required to scan fields of the order of some 10°, this following up is the only way of sweeping very large fields while still conserving a small opening in the optical system: for example one half-field: first by panoramic sweeping, then by sweeping from the horizon to the zenith. This is possible in particular with a device similar to that of FIG. 3.

Figure 4:
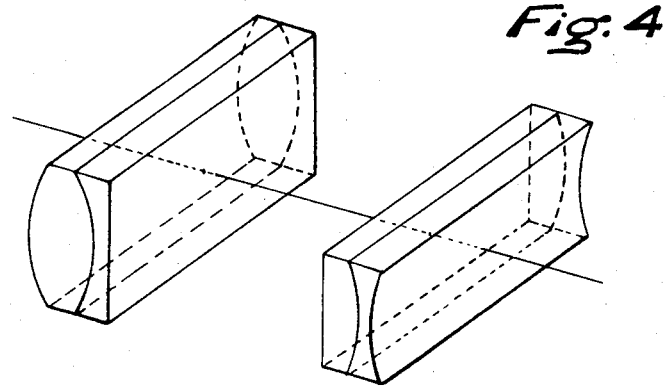
Figure 5:
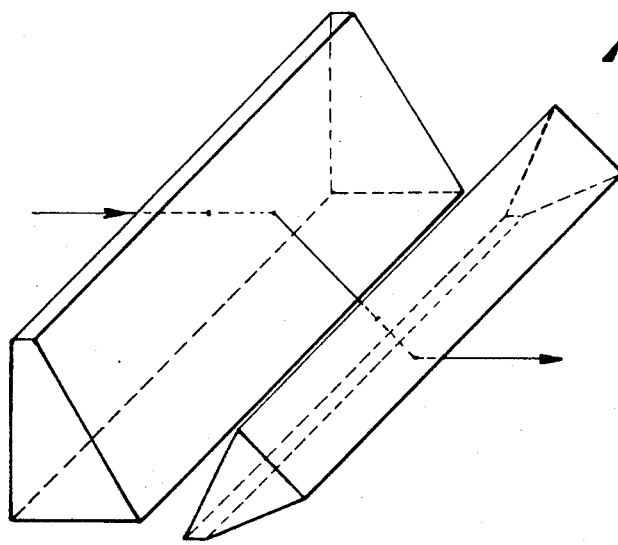
Figures 6, 7:
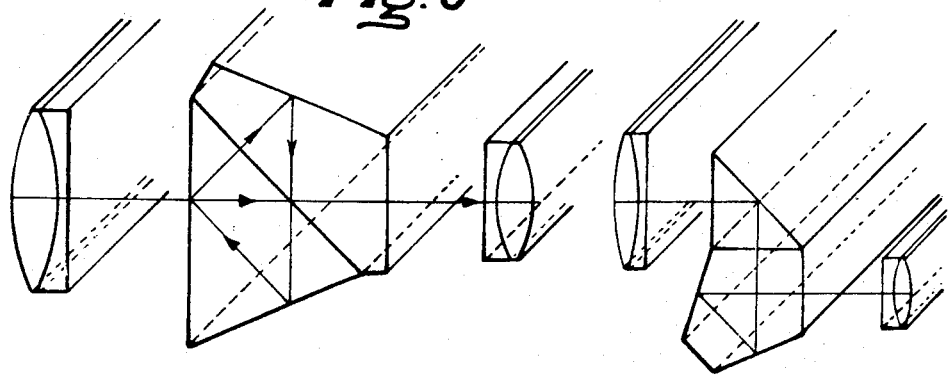

From among the anamorphic afocal optical systems having the property of magnifying twice and once in two directions of rectangular planes, use can be made, for example, of the known following systems:

Anamorphic Galilean system with cylindrical magnifying lenses 2 (FIG. 4);

Pseudo anamorphic Galilean system formed of Brewster-Amici prisms (FIG. 5), as is already known, there is no geometrical plane of symmetry parallel to the generatrixes; there is, however, an optical plane of symmetry which plays the same part;

Hemi-symmetric afocal system with converging elements, with the addition of a mirror or a prism of uneven number of reflections, either with direct vision or with displaced vision (FIGS. 6 and 7).

These systems are given only by way of example and are not intended to restrict the invention in any way.

The sighting device of type 1, as defined by FIGS. 1 and 2, gives an anamorphosed image of the landscape in the plane of the reticle I which is often not troublesome. It will be noted that by interposing between the mirror M and the device L a cylindrical afocal system with magnification of ½, and accordingly inverted, this disadvantage can be overcome. It is also possible to compensate in a like manner this anamorphic behaviour beyond the objective L, in the part of the sighting device which leads to the device Oc, behind which is located the eye of the observer.

The sighting device of type 1 described above stabilizes the sighting line strictly; nevertheless the image of the landscape generally shows obliquity about this sighting line in relation to the crossing lines of the recticle, and in order to overcome this disadvantage there can be interposed between the mirror M and the reticle I a rotating prism manually adjustable of the Wollaston or Pechan type (with unever number of reflections and with direct vision), which corrects the image of the landscape by a suitable angle, taking into account the rotation of the sighting device. It is also possible manually to cause the reticle to rotate and subsequently to correct the unit reticle/landscape by the rotation of a prism of the above type, arranged between the reticle and the eyepiece; the observed, placed behind the latter, will see a corrected landscape. This latter arrangement makes it possible to take into account any out-of-plumb introduced beyond the reticle, for example in the case where it is desired to keep the eyepiece of the sighting device fixed (the case of FIG. 3).

A further embodiment is shown in FIG. 8 to 11 and more particularly uses two mirrors fixed on the frames of the Cardan suspension of a gyroscope.

In the present embodiment, on the other hand, each of the mirrors are rigidly fixed on each of the gimbals of the gyroscope. As they have the same movements or the same vibrations in rotation as these rings; there inertia is not a hindrance for obtaining good stabilization.

FIG. 8 shows, as before, the arrangement of these mirrors $L_1$ and $M_1$ in the framework of the present invention, described below:

The stabilizing element is a gyroscope with two degrees of freedom: it is equipped with a rotor having an axis $A_1A_1$ carried by an inner frame or gimbal ring that can rotate about an axis $B_1B_1$, perpendicular to the axis $A_1A_1$; this axis $B_1B_1$ is itself carried by an inner frame or gimbal ring that in turn can rotate about the axis of the gyroscope $C_1C_1$, perpendicular to the axis $B_1B_1$; the bearings establishing this axis $C_1C_1$ are integral with the sighting device. The axes $A_1A_1$, $B_1B_1$, $C_1C_1$ intersect at a point $O_1$ that is the Cardan centre of the gyroscope.

If the axis $C_1C_1$ that is fixed relative to the sighting device is caused to rotate about point $O_1$ in all possible ways, the axis of the rotor always remains fixed in space. It is supposed that the sighting line is parallel to this axis $A_1A_1$ or, which comes to the same thing, that the axis $A_1A_1$ of the rotor passes through the point sighted $X_1$, supposed at infinity. The sighting line, parallel to the axis $A_1A_1$, will hereinafter be called: sighting line—"object."

Coming from the sighting point $X_1$ located at infinity, the dight encounters the mirror $M_1$. The latter is fixed on the inner frame or gimbal ring of the gyroscope and arranged in such a way that the image of the axis $A_1A_1$ given by the mirror $M_1$ is parallel to the axis $B_1B_1$; i.e. in such a way that the plane of the mirror $M_1$ is perpendicular to the plane ($A_1A_1$, $B_1B_1$) and makes an angle of 45° with the two axes ($A_1A_1$ and $B_1B_1$). Accordingly the mean light ray issuing from X, after having encountered the mirror $M_1$ approximately at its centre $m_1$ is reflected in the direction $B_1B_1$.

Said mean light ray then encounters the mirror $L_1$: the mirror $L_1$ is fixed on the outer frame of gimbal ring of the gyroscope; it is arranged in such a way that the image of the axis $B_1B_1$ given by the mirror $L_1$ is parallel to the axis $C_1C_1$; i.e. in such a way that the plane of the mirror $L_1$ is perpendicular to the plane ($B_1B_1$, $C_1C_1$) and makes an angle of 45° with the axes $B_1B_1$ and $C_1C_1$. The mean light ray coming from $X_1$ and from $M_1$ encounters the mirror $L_1$ approximately at its middle $l_1$ and is then reflected in the direction $C_1C_1$; now the axis $C_1C_1$ is fixed, accordingly the luminous ray issuing from the sighted point X is always reflected in the direction of the axis $C_1C_1$ which is fixed in relation to the body W of the sighting device (schematically shown in FIG. 8).

This mean light ray then encounters the objective lens L' of the sighting device properly speaking not fully shown but similar to V (FIG. 2) and fixed in the body $W_1$ of the sighting device $V_1$. The optical centre $J_1$ of the objective lens of this device and the crosslines $I_1$ of the reticle materialise a sighting line that will be called hereinafter: image sighting line. This image sighting device is by construction parallel to the axis $C_1C_1$. Finally, the light ray that has issued from the sighted point X, after having been reflected successively on the mirrors $M_1$ and $L_1$ and passing through the objective lens of the lunette, passes to the crosslines of the reticle, at $I_1$.

The most common of the sighting devices of this last embodiment has just been described above. Their will now be considered (FIG. 9) the particular case of the sighting device in which the mean light ray that has issued from the point X is confounded with the axis $B_2B_2$ after reflection from the mirror $M_2$, then with the axis $C_2C_2$ after reflecting from the mirror $L_2$. Accordingly, the optical axis $I_2J_2$ of the sighting device was selected as the extension of the axis $C_2C_2$. This particular case of the sighting device, shown in FIG. 9, makes it possible to avoid field stops of the entry pupil of the sighting device for rotations of the gyroscope or of the body of the sighting device about the axes $C_2C_2$ and $B_2B_2$, because the axis of the lunette will always be centered on the mirror $L_2$ without introducing complications into the construction of the sighting device.

It is established immediately, in this special case of the sighting device, that:

(1) If the body $W_2$ of the sighting device is rotated in all possible ways and in particular about axes $C_2C_2$, $B_2B_2$, $A_2A_2$, the image of the point sighted at infinity X forms constantly at $I_2$, at the crosslines of the reticle, when the point X is fixed and when the rotor is spinning, and there is no precession of the gyroscope. The object sighting line parallel to the axis $A_2A_2$ has as its image, through the optical system connected to the gyroscope (mirrors $M_2$ and $L_2$), the image sighting line $I_2J_2$, itself coincident with $C_2C_2$. And conversely, if the principle of thereverse return of the light is applied, $I_2J_2$ has as its image $A_2A_2$ through the same system.

(2) If by rotation of the gimbal rings of the gyroscope about axes $C_2C_2$ and $B_2B_2$, the axis $A_2A_2$ of the rotor is directed towards a first point at infinity $X_2$ of the landscape, said new point differing from the point $X_2$, the image of this point $X_2$ along the extension of the axis $A_2A_2$ always forms at $I_2$, at the crosslines of the reticle. Itis accordingly possible to pilot, i.e. to direct the object sighting line of the sighting device toward any point of the landscape simply by directing the axis $A_2A_2$ of the rotor toward this point, by precession of gyroscope by means of motor means for applying a couple, as explained above.

Figure 10:
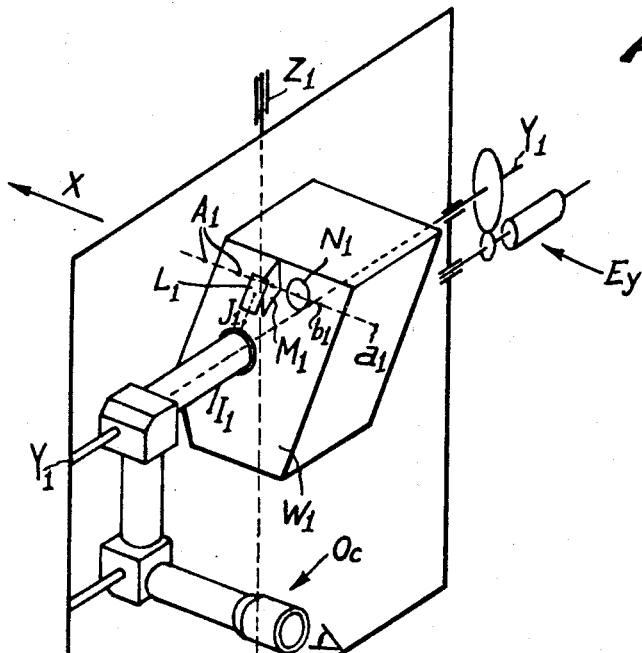
Figure 11:
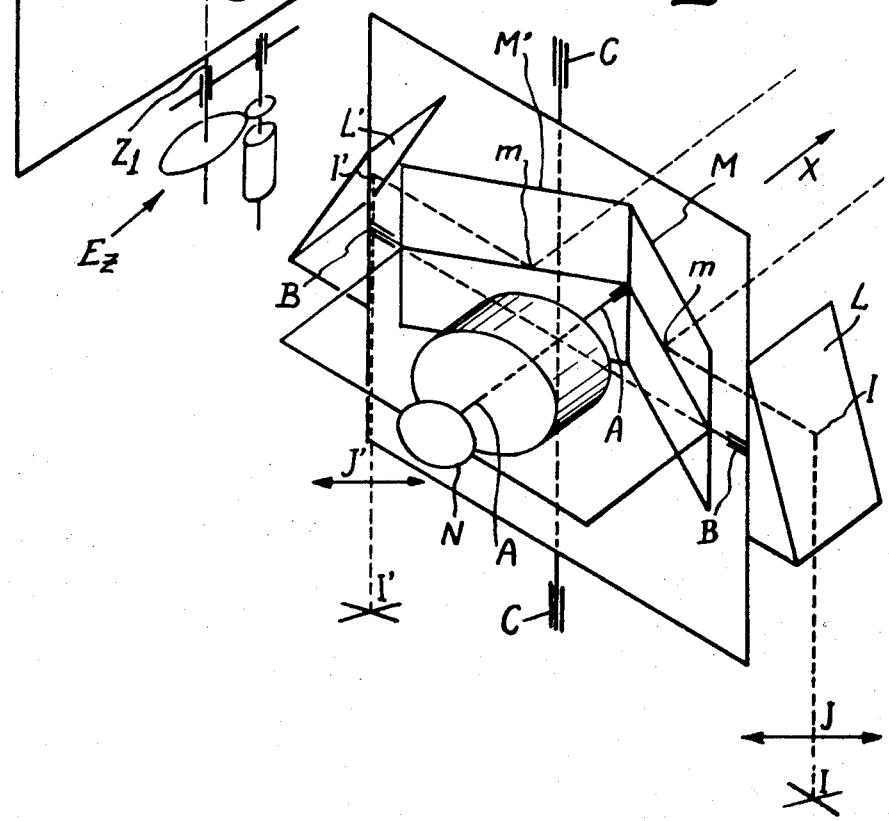

There is a means which makes it possible to avoid the stop effect of the entry pupil completely: in this connection it will be assumed that the arrangement of the elements of the gyroscope of FIG. 8 (gimbal rings, mirrors) is an initial arrangement, where the entry pupil is has no stop; to avoid stops, when the sighted point is changed, the body $W_1$ of the sighting device $V_1$ is controlled by the axis $A_1A_1$ of the rotor of the gyroscope in such a way as to recover constantly this initial arrangement, by means of rotations of the body $W_1$ of the sighting device $V_1$ equivalent to rotations about axes parallel to the Cardan axes $C_1C_1$ and $B_1B_1$ of the gyroscope. A method of ensuring this control is as follows (see FIG. 10): the axis $A_1A_1$ will be optically established by a small mirror $N_1$ which, in manufacture, is perpendicular thereto. Then, in the initial position, the direction of the plane of the mirror will be registered by regulating the optical axis $a_1b_1$ of an auto-collimator system $a_1$: cross hairs of a reticle disposed at at the object plane of a convergent lens $b_1$ integral with the body $W_1$ of the sighting device $V_1$, perpendicular to the mirror. The detention of the rotations of $W_1$ in relation to this mirror, i.e. in relation to the axis $A_1A_1$, is obtained by displacement of the image of a focal point of the objective lens of the auto-collimator system. A known servo mechanism shown schematically by drive means $E_y$ and $E_z$, ensures the cancelling out of dispersions by rotation of the body $W_1$ of the sighting device $V_1$, articulated about the two rectangular axes, which are furthermore not necessarily parallel to the axes $C_1C_1$ and $B_1B_1$ of the gyroscope. FIG. 10 shows an arrangement by which it is possible to achieve the aim sought.

It should be supposed that the axis $Z_1Z_1$ (vertical) ensures a complete panoramic sweeping and that the axis $Y_1Y_1$ (horizontal) ensures the vertical sweeping. There is shown diagrammatically, as if the covers had been removed, the image sighting line $I_1J_1$, the mirrors $M_1L_1$, the mirror $N_1$ and the axis $aa$ of the auto-collimator system. In this arrangement it is possible to keep the eyepiece $O_e$ fixed on site. This eyepiece may be disposed in any convenient position, by means of the reflection of mirrors (not shown).

In the above, no hypothesis has been made on the initial value of the angle $(A_1A_1, C_1C_1)$ of the axis $A_1A_1$ of the rotor and of the external axis $C_1C_1$ of the gyroscope: although this is not necessary, it is advantageous, in order to facilitate control by precession of the gyroscope, to take the angle $(A_1A_1, C_1C_1)$ to be equal to 90° or at least approximately this value.

It should be noted that the control of the body of the sighting device $V_1$ by the axis $A_1A_1$ of the rotor of the gyroscope is with the sole aim of re-centring the optical systems and need not be highly accurate; accuracy of the order of 1° is for instance adequate. Furthermore, it is not necessary for this "pursuit" of the axis $A_1A_1$ by the body of the sighting device $V_1$ which plays the part of a "ghost" follower, to be made with a perfectly regular movement, as the vibrations or irregularities in the rotations of $V_1$ do not play a part in the aiming.

Between the most common case (FIG. 8) and the special case (FIG. 9) indicated above, there are intermediate cases, i.e. those in which the mean average ray of light is either coincident solely with $B_1B_1$ or solely with $C_1C_1$. In these two cases the device for controlling the body of the sighting device $V_1$ is of simplified form.

It will be noted that the sighting devices satisfy the conditions necessary for the stabilization of the sighting line that have already been expressed, and which are characteristic of sighting devices having at one to the same time optical elements connected to a gyroscope and an image sighting line materialized in the body of the sighting device, behind the optical elements connected to the gyroscope: these conditions are as follows:

(a) The image sighting line should be parallel to the external axis of the gyroscope.

(b) The image of the axis of the centrifuge of the gyroscope, through the optical system formed in the first place of the optical elements connected to the sighting device and arranged in front of those elements that are connected to the gyroscope, and furthermore of the optical elements connected to the gyroscope, should be parallel to the axis of the outer frame of the gyroscope.

It has been seen that the sighting devices of the invention stabilize the sighting line very strictly; nevertheless the image of the landscape is generally found to flow over (i.e. about this sighting line) in relation to the crossing lines of the reticle. To overcome this disadvantage as in the preceding embodiment, between the mirror $L_1$ and the reticle $I_1$ a rotating prism of the Wollaston or Pechan type can be interposed (with uneven reflection number and with direct vision) that corrects the landscape by a suitable angle, taking into acocunt the rotations of the sighting device. It is also possible to cause the reticle to rotate about the optical axis of the lunette and subsequently to correct the unit of both images of the reticle/landscape by the rotation of a prism of the above type, arranged between the reticle and the eyepiece: the observer placed behind the latter will see a corrected landscape. This latter arrangement makes it possible to take into account any out-of-plumb introduced after the reticle, for example in the case where it is desired to keep the eyepiece of the sighting device fixed (the case of FIG. 10).

In order to simplify explanation, up to the present only one single light path for the various types of the sighting devices described has been spoken of, corresponding for example to a monocular sighting device. As for the types described above, it is possible, however, to imagine the provision of several optical trains coupled together, either by enlarging the mirrors or by the addition of additional mirrors. For two light paths, for instance, the symmetrical device showin in FIG. 11 can be selected. The symmetrical positions of the mirrors facilitate the balancing of the gimbal rings. It is accordingly easy to imagine the provision of several coupled optical trains, such as:

Two visual trains making it possible to provide a sighting device for binocular observation;

One train or a plurality of trains for infra-red detection and one visual train, the two systems being closely coupled;

One or a plurality of guiding bundles, for example for guiding an appliance and a visual optical train, the two systems being closely connected;

The three trains of a laser telemeter comprising, as known: that of the emergent coherent light beam, and that of the received coherent light beam and that of the sighting device associated with the other two.

Furthermore, the groupings indicated above can be arranged as follows:

They can be combined with each other;

They can necessitate of the same enlargement but of different optical characteristics anamorphic systems for the various bundles of light rays indicated above, in particular when the wave lengths of the radiations used are not the same (visible and infrared);

They may be produced only for the mirrors connected to the gyroscope, in particular the light rays can subsequently take different paths, either immediately after reflection on these mirrors or after a certain number of systems in common.

Finally, the mirrors connected to the gyroscope can be replaced entirely or in part by prisms.

What is claimed is:

1. An optical viewing device for use on a moving vehicle, comprising housing means containing a telescope assembly having an objective and an eyepiece, a gyroscope comprising a rotor, an inner gimbal on which the rotor is rotatably supported, an outer gimbal in which the inner gimbal is pivotally supported, means for pivotally mounting the outer gimbal in the housing means, the pivotal axis of the inner gimbal on the outer gimbal intersecting the pivotal axis of the outer gimbal on the housing means at a point that lies on the axis of rotation of the rotor, means to direct the axis of the rotor toward a point to be observed, said housing means interconnecting the telescope and the outer gimbal whereby the optical axis of the telescope objective remains parallel to the pivotal axis of the outer gimbal, a mirror rigidly fixed to the inner gimbal and optically aligned with said telescope and reflecting rays from said point to be observed in the direction of the pivotal axis of one of the gimbals, and optical means for directing to said eyepiece the rays reflected by said mirror from said point to be observed despite movements of the vehicle.

2. An optical viewing device as claimed in claim 1, in which the mirror is parallel to the axis of rotation of the inner gimbal, said optical means comprising lens means disposed in front of the mirror and having an enlargement of 2:1 in the plane of view passing through the pivotal axis of the outer gimbal and 1:1 in the plane of view perpendicular thereto which passes through the axis of rotation of the inner gimbal.

3. An optical viewing device as claimed in claim 1, in which the mirror is parallel to the axis of rotation of the outer gimbal, said optical means comprising a mirror rigidly secured to the outer gimbal parallel to said axis of rotation of the rotor.

References Cited

UNITED STATES PATENTS

| | | | |
|---|---|---|---|
| 2,684,007 | 7/1954 | Newell | 350—16UX |
| 3,200,250 | 8/1965 | Bouwers | 350—182X |
| 3,371,161 | 2/1968 | Crouella | 350—16 |
| 3,035,477 | 5/1962 | Bosch et al. | |
| 3,326,619 | 6/1967 | Johnson et al. | |
| 2,811,042 | 10/1957 | Kenyon | 350—16 |
| 2,829,557 | 4/1958 | Jensen | 350—16 |
| 2,986,966 | 6/1961 | McCartney et al. | 350—16 |
| 3,326,619 | 6/1967 | Johnson et al. | 350—16 |
| 3,035,477 | 5/1962 | Bosch et al. | 88—1S |

FOREIGN PATENTS

| | | | |
|---|---|---|---|
| 86,180 | 11/1965 | France | 350—16 |
| 1,372,585 | 8/1964 | France. | |
| 1,329,532 | 5/1963 | France. | |
| 226,163 | 5/1925 | Great Britain. | |
| 269,373 | 5/1927 | Italy | 350—16 |
| 1,372,585 | 8/1964 | France | 88—1(S) |
| 1,329,532 | 5/1963 | France | 88—1(S) |
| 226,163 | 5/1925 | Great Britain | 88—1(S) |

PAUL R. GILLIAM, Primary Examiner